(12) United States Patent
Shah et al.

(10) Patent No.: US 12,395,388 B2
(45) Date of Patent: Aug. 19, 2025

(54) INTERFERENCE RANDOMIZATION IN ORTHOGONAL COVER CODES

(71) Applicant: QUALCOMM Incorporated, San Diego, CA (US)

(72) Inventors: Syed Hashim Ali Shah, San Diego, CA (US); Ayan Sengupta, San Diego, CA (US); Alberto Rico Alvarino, San Diego, CA (US); Xiao Feng Wang, San Diego, CA (US); Liangping Ma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 46 days.

(21) Appl. No.: 18/205,457

(22) Filed: Jun. 2, 2023

(65) Prior Publication Data

US 2024/0406046 A1    Dec. 5, 2024

(51) Int. Cl.
 *H04L 27/26* (2006.01)
 *H04J 13/16* (2011.01)

(52) U.S. Cl.
 CPC ........ *H04L 27/26035* (2021.01); *H04J 13/16* (2013.01)

(58) Field of Classification Search
 CPC ............................................... H04L 27/26035
 USPC ....................................................... 375/260
 See application file for complete search history.

(56) References Cited

U.S. PATENT DOCUMENTS

| | | | |
|---|---|---|---|
| 2012/0140716 A1* | 6/2012 | Baldemair | H04J 13/18 370/329 |
| 2014/0329553 A1* | 11/2014 | Nakashima | H04W 52/365 455/522 |
| 2014/0368216 A1* | 12/2014 | Pailloncy | G01R 23/00 324/602 |
| 2015/0071183 A1* | 3/2015 | Bontu | H04L 1/1861 370/329 |
| 2018/0295651 A1* | 10/2018 | Cao | H04W 72/23 |
| 2022/0182109 A1* | 6/2022 | Lopez | H04B 7/046 |
| 2023/0016376 A1* | 1/2023 | Sun | H04B 7/0695 |

FOREIGN PATENT DOCUMENTS

| | | |
|---|---|---|
| EP | 1059818 B1 | 2/2007 |
| WO | 2022231484 A1 | 11/2022 |

OTHER PUBLICATIONS

International Search Report and Written Opinion—PCT/US2024/030228—ISA/EPO—Sep. 10, 2024.

\* cited by examiner

*Primary Examiner* — Lihong Yu
(74) *Attorney, Agent, or Firm* — Dinsmore & Shohl LLP

(57) ABSTRACT

Certain aspects of the present disclosure provide techniques for selecting a first orthogonal cover code (OCC) codeword from an OCC matrix for a transmission occurring during a first transmission time interval based on a first pseudo-random codeword allocator function, such as a first pseudo-random permutation matrix, corresponding to the first transmission time interval; and sending the transmission during the first transmission time interval using the first OCC codeword.

29 Claims, 9 Drawing Sheets

INTERFERENCE RANDOMIZATION IN ORTHOGONAL COVER CODES

FIELD OF THE DISCLOSURE

Aspects of the present disclosure relate to wireless communications, and more particularly, to techniques for cover coding data with orthogonal cover codes (OCC) using an interference randomization scheme.

DESCRIPTION OF RELATED ART

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communication by a user equipment (UE). The method includes selecting a first orthogonal cover code (OCC) codeword from an OCC matrix for a transmission occurring during a first transmission time interval based on a first pseudo-random codeword allocator function corresponding to the first transmission time interval; and sending the transmission during the first transmission time interval using the first OCC codeword.

Another aspect provides a method for wireless communication by a network entity. The method includes obtaining a transmission encoded with an OCC codeword during a first transmission time interval within a predefined transmission timeframe, the transmission from a first user equipment; selecting, from a plurality of pseudo-random codeword allocator functions, a pseudo-random codeword allocator function corresponding to the first transmission time interval; selecting the OCC codeword from an OCC matrix corresponding to the first user equipment and based on the selected pseudo-random codeword allocator function; and decoding the transmission with the selected OCC codeword corresponding to the first user equipment.

Other aspects provide: one or more apparatuses operable, configured, or otherwise adapted to perform any portion of any method described herein (e.g., such that performance may be by only one apparatus or in a distributed fashion across multiple apparatuses); one or more non-transitory, computer-readable media comprising instructions that, when executed by one or more processors of one or more apparatuses, cause the one or more apparatuses to perform any portion of any method described herein (e.g., such that instructions may be included in only one computer-readable medium or in a distributed fashion across multiple computer-readable media, such that instructions may be executed by only one processor or by multiple processors in a distributed fashion, such that each apparatus of the one or more apparatuses may include one processor or multiple processors, and/or such that performance may be by only one apparatus or in a distributed fashion across multiple apparatuses); one or more computer program products embodied on one or more computer-readable storage media comprising code for performing any portion of any method described herein (e.g., such that code may be stored in only one computer-readable medium or across computer-readable media in a distributed fashion); and/or one or more apparatuses comprising one or more means for performing any portion of any method described herein (e.g., such that performance would be by only one apparatus or by multiple apparatuses in a distributed fashion). By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

DETAILED DESCRIPTION

Figure 1:
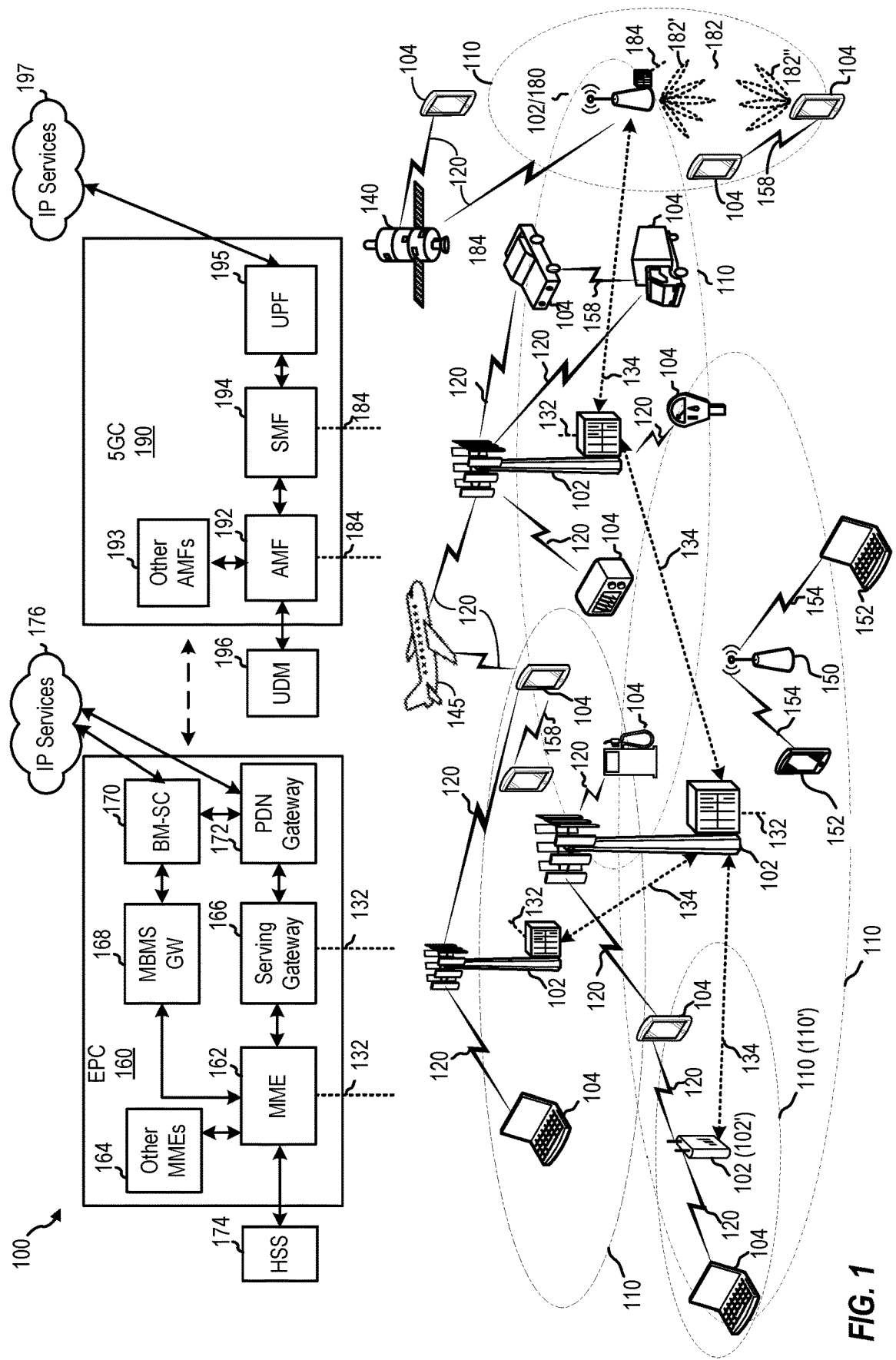
FIG. 1 depicts an example wireless communications network.

Aspects of the present disclosure provide apparatuses, methods, processing systems, and computer-readable mediums for cover coding data with orthogonal cover codes (OCC) using an interference randomization scheme.

As wireless communication systems grow, an increasing number of wireless apparatuses (e.g., user equipments (UEs)) communicate with a predefined set of time-frequency resources. Multiple access schemes, such as multiplexing multiple UEs, can increase the number of UEs within the same amount of time-frequency resources. However, multiplexing multiple UEs may create interference between signals from the multiple UEs at base stations. Furthermore, the aforementioned interference can arise from UE to UE communication, for example, through sidelink. Orthogonal cover codes (OCCs) can mitigate the interference. For example, during a transmission timeframe, T, a UE is assigned a fixed OCC so that data from the UE is cover coded across repetitions in an orthogonal manner.

While OCCs can mitigate the interference caused by multiplexing multiple UEs, phase impairments, such as carrier frequency offset (CFO), may impact OCC performance, for example, as described herein below. CFO occurs, for example, when a local oscillator signal in a receiver UE does not synchronize with the carrier single contained in the received signal. Thus, the received signal is shifted in frequency. Accordingly, when CFOs of two or more UEs being multiplexed are far apart, the interference caused by these UEs can be significant and result in wireless communication performance loss. Additionally, for instances where fixed OCC are utilized, the loss persists throughout the entire transmission time leading to transmissions from two or more UEs being un-decodable.

For purposes of explanation of the performance loss associated with CFO, and without limitation, consider a scenario in which a wireless communication system includes 4 user equipments (UE1, UE2, UE3, and UE4) using a discrete Fourier transform (DFT) matrix as the basis for OCC, where each codeword, (e.g., row of the DFT matrix), is separated by 400 Hz. Additionally, for example, the CFO on UE1 and UE2 are +200 Hz and −200 HZ, respectively and UE3 and UE4 have comparatively small CFO. Furthermore, the codeword of UE1 is separated from the codeword of UE2 by 400 Hz, for example, as being defined by consecutive rows of the DFT matrix. In such an instance, the CFO on UE1 and UE2 results in the transmission of both UEs appearing as the same OCC codeword at the network received (e.g., a base station) during the entire transmission timeframe, T. Accordingly, the transmissions from the two UEs, UE1 and UE2, are un-decodable at the network receiver because the CFO on UE1 and UE2 of +200 Hz and −200 HZ, respectively cancels out the 400 Hz separation introduced by the OCC codeword. That is, the transmission from the two UEs, UE1 and UE2, have the same or at least indistinguishable frequencies.

To overcome the aforementioned technical problem, aspects described herein are directed to cover coding data with OCCs using an interference randomization scheme rather than utilizing fixed OCC for an entire transmission timeframe, T. The interference randomization scheme has the beneficial technical effect of averaging out interference cause by phase impairments due to CFO, which leads to performance gains in wireless communications. For example, performance gains can be realized with respect to better decoding performance which increases data throughput, reduction in retransmissions, less power used, enabling higher coding rates, better network efficiency, and/or the like. That is, implementation of randomized assignment of codewords to UEs in the wireless communication system during the transmission timeframe, T, enables the interference to be shared among all UEs and furthermore averaged out over the transmission timeframe, T. For example, in some transmission time intervals, t, of the transmission timeframe T, UE1 and UE3 will have consecutive codewords and UE2 and UE4 will have consecutive codewords, which aids in averaging out the interference across the entire transmission timeframe, T. With reference to the above described example, in cases where UE1 and UE3 have consecutive codewords and where UE2 and UE4 have consecutive codewords, the transmissions are more resilient to interference due to CFO.

For example, in one aspect, a first UE, selects a first OCC codeword from an OCC matrix for a transmission occurring during a first transmission time interval based on a first pseudo-random codeword allocator function corresponding to the first transmission time interval. For purposes of explanation of the interference randomization scheme, the pseudo-random codeword allocator function is described herein as a pseudo-random permutation matrix. However, it is understood that the pseudo-random codeword allocator function is as an expression, a matrix, a logical operation, or the like that is configured to indicate to a UE which codeword from the OCC matrix is to be selected for a corresponding transmission time interval (e.g., e.g., t, t+1, t+2, . . . ) of the predefined transmission timeframe, T.

Next, the first UE sends the transmission during the first transmission time interval using the first OCC codeword. In aspects, the first UE being multiplexed in the wireless communication system is associated with a row, for example, the first row, of the first pseudo-random permutation matrix. Likewise, a second UE being multiplexed in the wireless communication system is associated with a different row, for example, the second row, of the first pseudo-random permutation matrix. The first pseudo-random permutation matrix indicates to each UE being multiplexed as to which row of the OCC matrix is to be selected for use as the first OCC codeword for the transmission occurring during the first transmission time interval of a plurality of transmission time intervals within a predefined transmission time.

During a second transmission time interval within the predefined transmission time, the first UE selects a second OCC codeword from the OCC matrix for a transmission occurring during a second transmission time interval based on a second pseudo-random permutation matrix corresponding to the second transmission time interval. Next, the second UE sends the transmission during the second transmission time interval using the second OCC codeword. In aspects, the first UE being multiplexed in the wireless communication system is associated with a row, for example, the first row, of the second pseudo-random permutation matrix. Likewise, a second UE being multiplexed in the wireless communication system is associated with a different row, for example, the second row, of the second pseudo-random permutation matrix. The second pseudo-random permutation matrix indicates to each UE being multiplexed as to which row of the OCC matrix is to be selected for use as the second OCC codeword for the transmission occurring during the second transmission time interval of a plurality of transmission time intervals within a predefined transmission time.

It is noted that the aforementioned interference randomization scheme of using a plurality of pseudo-random permutation matrices each corresponding to one of a plurality of transmission time intervals for selecting the OCC codeword enables randomization of assigned OCC codewords to UEs and/or network entities (e.g., base stations) through the transmission timeframe.

Thus, a beneficial technical effect of this interference randomization scheme is an increase in capacity of multiplexing UEs using OCC codewords within the predefined time-frequency resources and averaging out interference caused by phase impairments due to CFO that impacts OCC performance.

Aspects described herein may thus be used to reduce impairments due to phase impairments in multiple access schemes using OCC thereby improving reliability in the communication with multiplexed UEs. Thus, aspects described herein provide a technical solution to the interference problem discussed above.

Introduction to Wireless Communications Networks

The techniques and methods described herein may be used for various wireless communications networks. While aspects may be described herein using terminology commonly associated with 3G, 4G, 5G, 6G and other generations of wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). As such communications devices are part of wireless communications network 100, and facilitate wireless communications, such communications devices may be referred to as wireless communications devices. For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and UEs.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
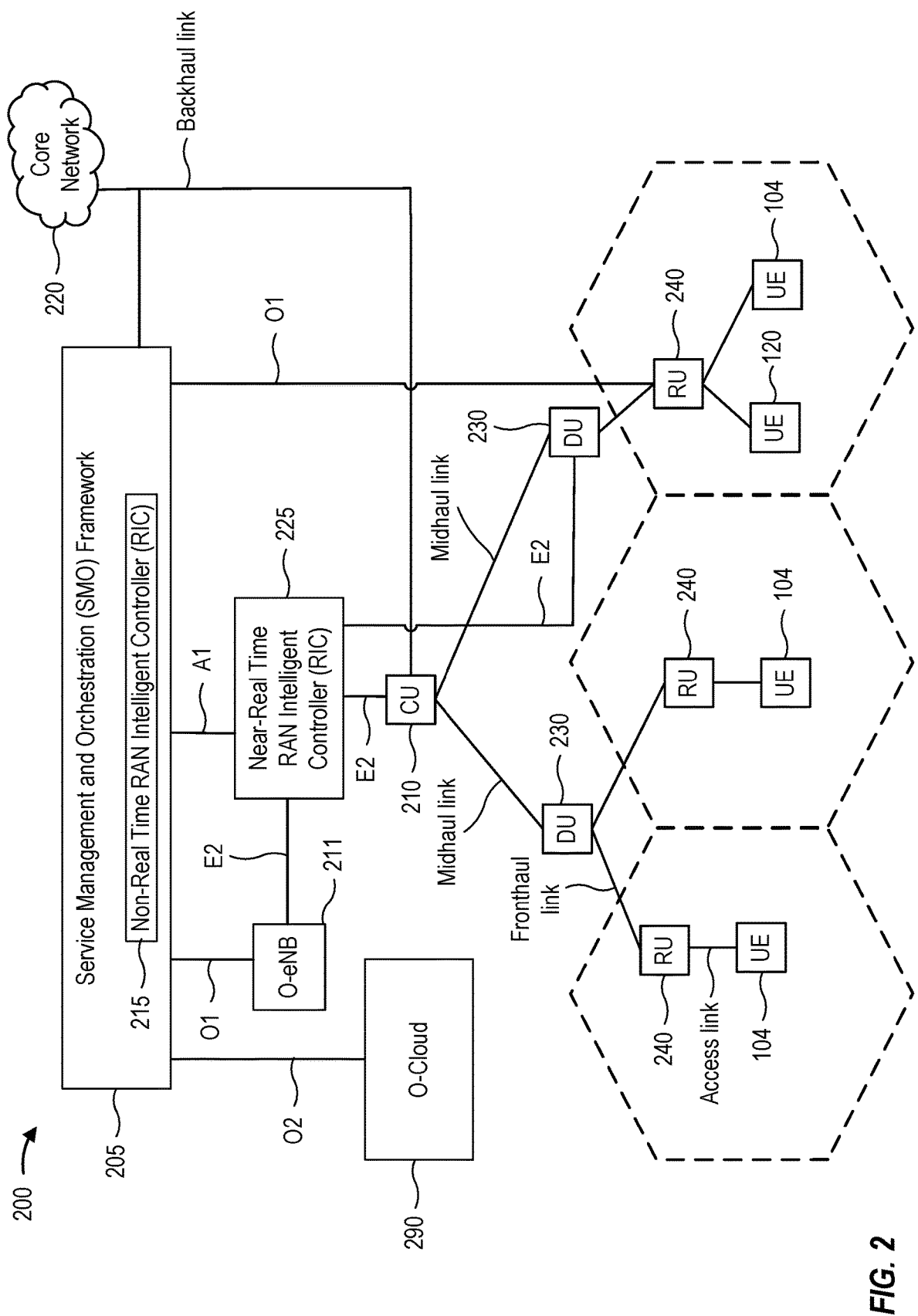
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUS), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to as (interchangeably) as "Sub-6 GHz". Similarly, 3GPP currently defines Frequency Range 2 (FR2) as including 24,250 MHz-52,600

MHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QOS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUS) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUS 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via 01) or via creation of RAN management policies (such as A1 policies).

Figure 3:
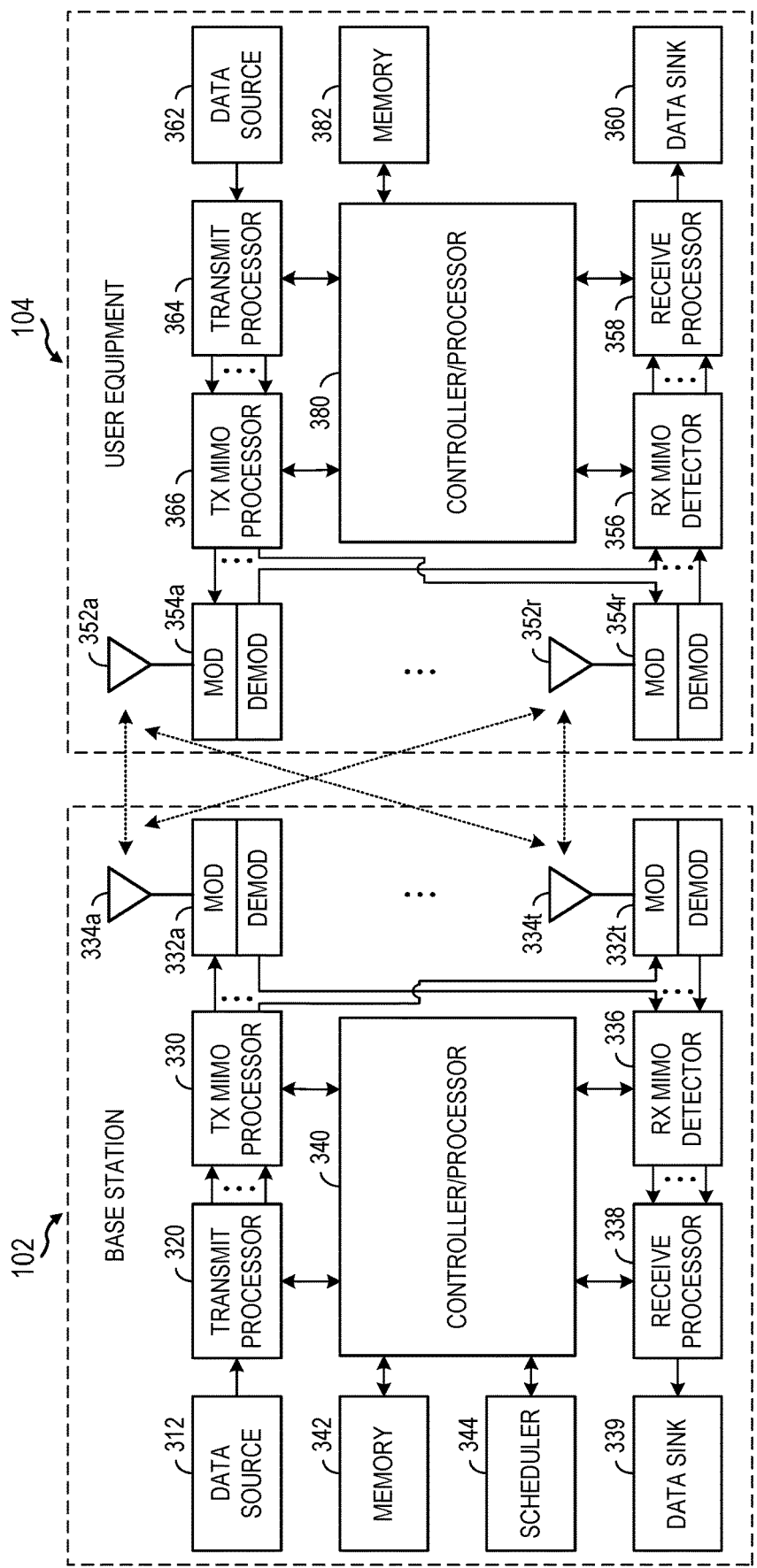
FIG. 3 depicts aspects of an example base station and an example user equipment (UE).

FIG. 3 depicts aspects of an example BS 102 and a UE 104.

Generally, BS 102 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical hybrid automatic repeat request (HARQ) indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

RX MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a RX MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figure 4:
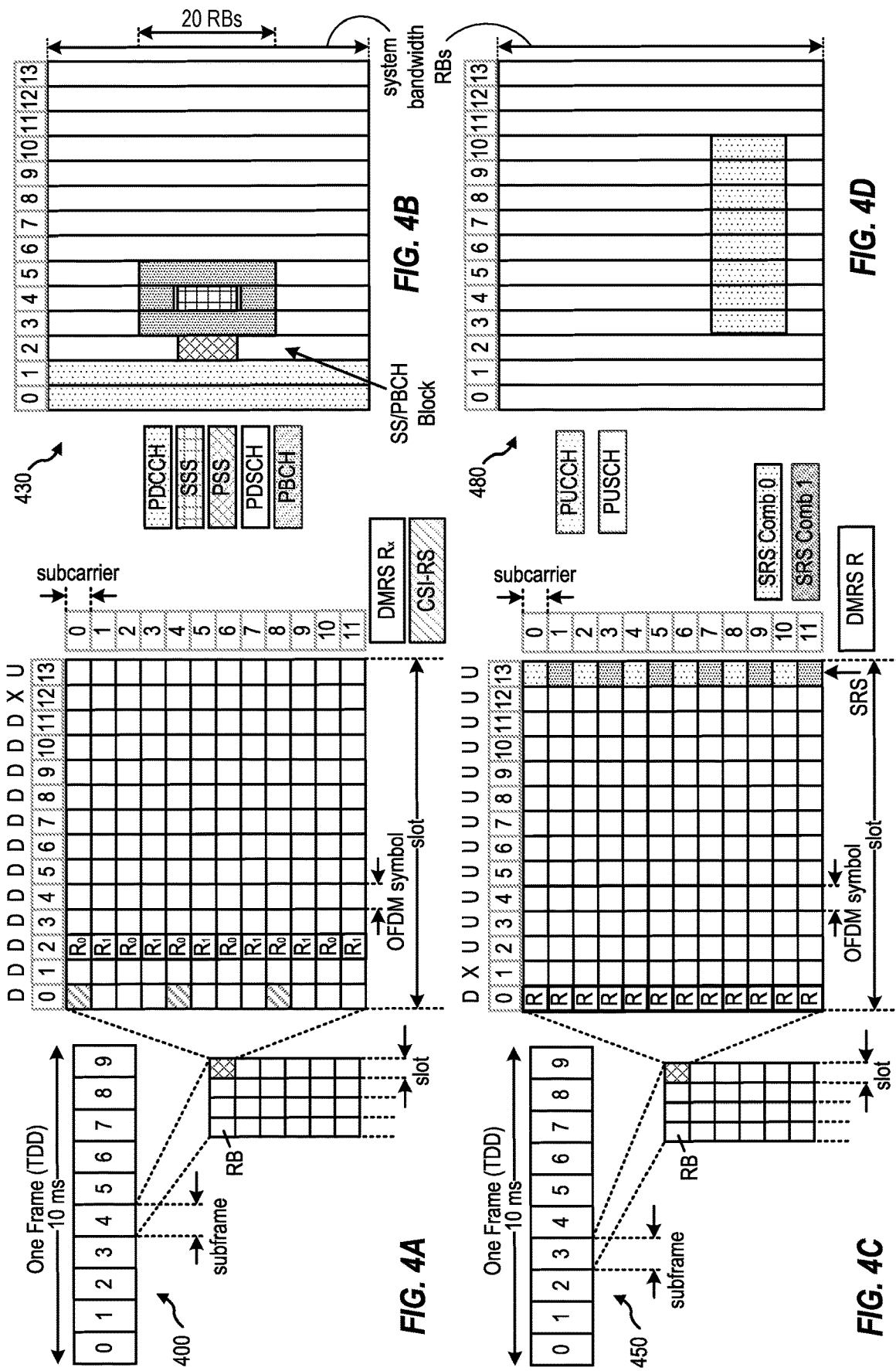
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology u, there are 14 symbols/slot and 2μ slots/subframe. The subcarrier spacing and symbol length/duration are a function of the numerology. The subcarrier spacing may be equal to 24×15 kHz, where u is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Aspects Related to Cover Coding Data With OCC Using an Interference Randomization Multiple access schemes are used to multiplex multiple UEs (e.g., 104, FIGS. 1 and 3) to increase the capacity of UEs capable of utilizing a predefined set of time-frequency resources for transmissions within a predefined transmission timeframe, T. In conventional multiple access schemes each multiplexed UE is assigned a fixed OCC codeword. However, interference introduced by phase impairments such as CFO cause OCC coded transmissions to be un-decodable at a network receiver, as described herein above. To solve this problem, the herein described interference randomization scheme enables a pseudo-random selection of the OCC codeword by a UE and utilized for individual transmissions within the predefined transmission timeframe. For example, for each transmission time interval, t, within the predefined transmission timeframe, T, one or more different OCC codewords are selected and used for sending transmissions.

Figure 5:
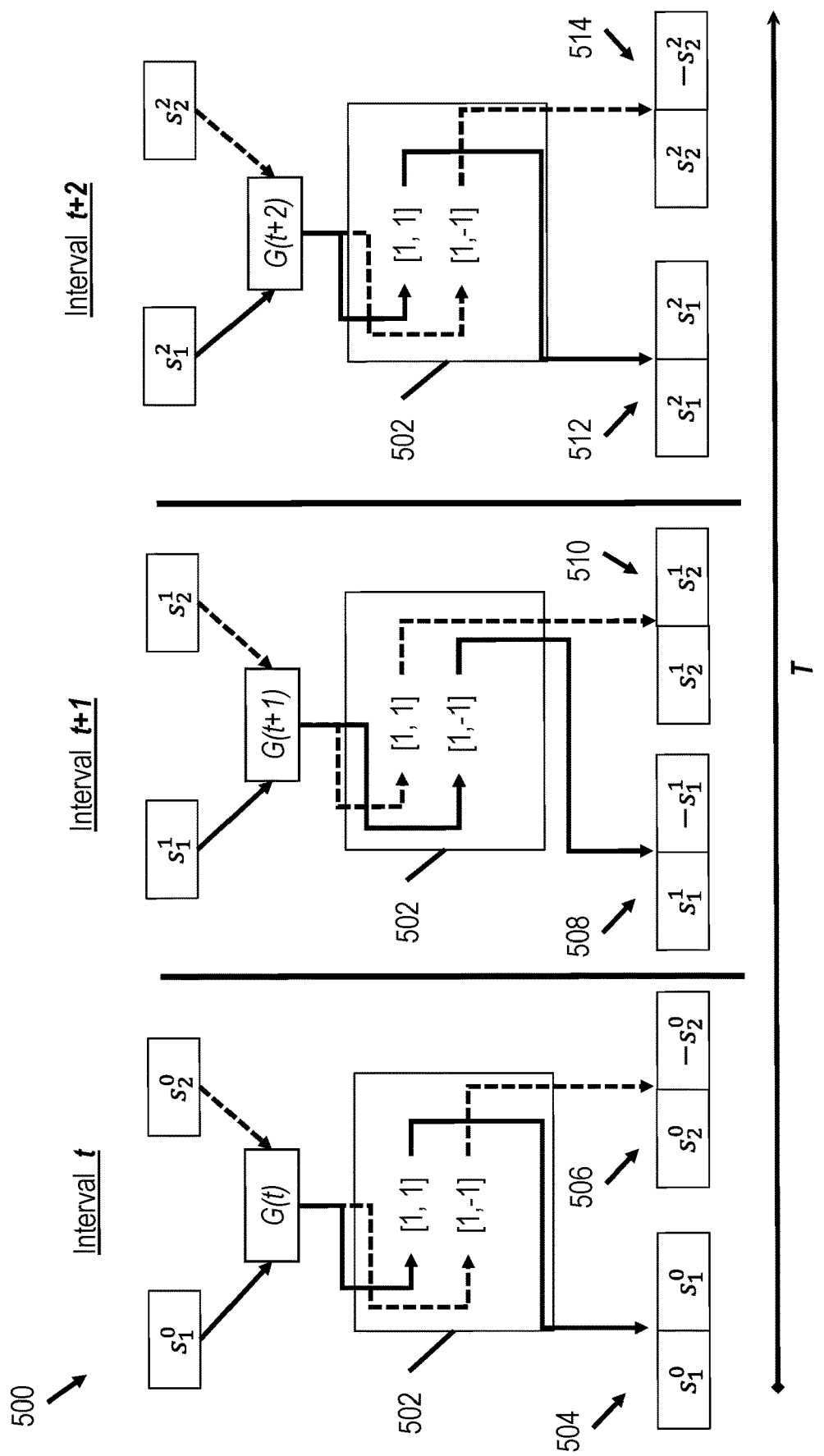
FIG. 5 depicts an illustrative example of cover coding data with OCC codewords using an interference randomization scheme.

FIG. 5 depicts an illustrative example of cover coding data with OCC codewords using the interference randomization scheme across a predefined transmission timeframe, T. The predefined transmission timeframe, T, includes a plurality of transmission time intervals, e.g., t, t+1, t+2, ... , t+n, and T-t to T. As depicted in FIG. 5, the plurality of transmission time intervals illustrates the first three transmission time intervals, t, t+1, and t+2, of the predefined transmission timeframe, T. While not a requirement, the number of transmission time intervals may be equal to or greater than two times the number of UEs being multiplexed to average out average out interference caused by phase impairments due to CFO. FIG. 5 illustrates implementation of cover coding data with OCC codewords using the interference randomization scheme in a wireless communication system multiplexing two UEs. However, the illustrated example of FIG. 5 is extendable to multiplex M number of UEs, which also referred to herein as the multiplexing order, M. The multiplexing order may be included as an element of the interference randomization configuration for a network. That is, more than two UEs can be multiplexed using the with OCC codewords using the interference randomization scheme shown and described herein.

In aspects, a UE informs the network that it can support multiplexing. Whether a UE can support multiplexing may depend on the phase coherence capabilities associated with the UE. In turn, the network configures the UE, for example, via radio resource control (RRC) signaling or medium access control (MAC) control element signaling with information regarding the interference randomization with OCC to be used on the network. For example, the network and each UE to be multiplexed is provided a multiplexing order M based on the phase coherence capability of the UE. Additionally, the network sends the UE information indicating the one or more signals that support application of OCC on the network. For example, the one or more signals may include, but not limited to a physical uplink shared channel (PUSCH) or a demodulation reference signal (DMRS).

In aspects, the network and the UE agree on a seed value(s) for which the plurality of pseudo-random permutation matrices are generated for the predefined transmission timeframe, T. The network and UE need to agree on a seed value(s) and/or be configured beforehand so that the randomization can be deterministically reproduced by the receiver for decoding. As such, the interference randomization scheme is pseudo-random as opposed to being fully random. For example, the network may select and send the seed value to the UEs or the UE may indicate to the network the seed value which is to be used for the interference randomization. In either case, the network and the UE need to agree so that the encoded signals can be decoded. That is, the agreement makes sure that for each transmission time interval, the UE sends the data with the correct OCC codeword and the network uses the same codeword to successfully decode signals for the concerned UE. It should be understood that the network communicates with and reaches an agreement on a seed value(s) that is used for each of the UEs being multiplexed during the predefined transmission timeframe. In other words, each of the UEs being multiplexed utilize the same seed value and a predefined codeword allocator function (e.g., such as a predefined permutation matrix) to generate a plurality of pseudo-random codeword allocator functions (e.g., such as the pseudo-random permutation matrices, where one codeword allocator function (e.g., one permutation matrix) corresponds to each of the transmission time intervals of the predefined transmission timeframe. In aspects, the seed value(s) can be based on at least one of a cell identification number, a user equipment identification number, a frame index, a subframe index, or other value.

As noted above, for purpose of describing the interference randomization scheme the codeword allocator function and pseudo-random codeword allocator function is discussed herein as a permutation matrix and pseudo-random permutation matrix, respectively. However, it is understood that the pseudo-random codeword allocator function is a function, matrix, or the like that is configured to indicate to a UE which codeword from the OCC matrix is to be selected for a corresponding transmission time interval (e.g., e.g., t, t+1, t+2, . . . ) of the predefined transmission timeframe, T. For example, the predefined permutation matrix for a wireless communication system comprising two UEs to be multiplexed may be the following matrix, $$\begin{bmatrix} 0 & 1 \\ 1 & 0 \end{bmatrix}.$$

To generate pseudo-random permutation matrices, the UE combines the predefined permutation matrix with the seed value(s). Each row of the pseudo-random permutation matrix corresponds to a particular UE being multiplexed. For example, UE1 may correspond to a first row of the generated pseudo-random permutation matrices, while UE2 correspond to a second row of the generated pseudo-random permutation matrices.

In some aspects, each UE being multiplexed generates a pseudo-random permutation matrix, (e.g., G(t), G(t+1), G(t+2), . . . ), for each of the transmission time intervals, (e.g., t, t+1, t+2, . . . ), of the predefined transmission timeframe, T. In some aspects, the network may provide each of the UEs being multiplex with the pseudo-random permutation matrix for each of the transmission time intervals of the predefined transmission timeframe and indicate which row of the pseudo-random permutation matrix corresponds to the respective UE.

The generated pseudo-random permutation matrices, (e.g., G(t), G(t+1), G(t+2) . . . ), indicate to the UE which row of an OCC matrix to use as the codeword for the corresponding transmission time interval. That is, since the pseudo-random permutation matrices comprise exactly one entry of 1 in each row and each column and 0s elsewhere, the i-th column of the pseudo-random permutation matrices containing an entry of 1 indicate to the UE the k-th row of the OCC matrix which is to be selected for use as the codeword during a transmission occurring during the corresponding transmission time interval. In aspects, the OCC matrix (H) can be a Hadamard matrix or a discrete Fourier transform matrix. The OCC matrix has a dimension based on M, which may be M×M, or M×X, or X×M, where, as above, M is a number of UEs being multiplexed and X may be a dimension not based on the number of UEs.

Referring now specifically to FIG. 5, a transmission, s, for UE, i, during the first three transmission intervals, j, of a predefined transmission timeframe, T, is illustrated. The bold lines correspond to UE1 and the dashed lines correspond to UE2. In this illustrated example of FIG. 5, the OCC matrix is a 2×2 Hadamard matrix, $$\begin{bmatrix} 1 & 1 \\ 1 & -1 \end{bmatrix}.$$

At time interval t, $s_1^0$ corresponds to a transmission of UE1 to be encoded using a first OCC codeword and $s_2^0$ corresponds to a transmission of UE2 to be encoded using a second OCC codeword. UE1 and UE2 select the first pseudo-random permutation matrix, G(t), from a plurality of pseudo-random permutation matrices, because the first pseudo-random permutation matrix, G(t), corresponds to the first transmission time interval, t. The first pseudo-random permutation matrix, G(t), may be the following matrix, $$\begin{bmatrix} 1 & 0 \\ 0 & 1 \end{bmatrix},$$

where UE1 corresponds to the first (top) row of the matrix and UE2 correspond to the second (bottom) row of the matrix. Regarding UE1, since the first column of the first pseudo-random permutation matrix, G(t), contains a 1, this indicates to UE1 to select the OCC codeword from the first row (e.g., the k-th row, where k equals 1) of the OCC matrix 502 as the OCC codeword for the transmission during the first transmission time interval, t. Regarding UE2, since the second column of the pseudo-random permutation matrix, G(t), contains a 1, this indicates to UE2 to select the OCC codeword from the second row (e.g., the k-th row, where k equals 2) of the OCC matrix 502 as the OCC codeword for the transmission during the first transmission time interval, t. UE1 uses the selected OCC codeword for encoding and sending the transmission 504 during the first transmission time interval, t. UE2 uses the selected OCC codeword for encoding and sending the transmission 506 during the first transmission time interval, t.

At time interval t+1, $s_1^1$ corresponds to a transmission of UE1 to be encoded using an OCC codeword and $s_2^1$ corresponds to a transmission of UE2 to be encoded using an OCC codeword. UE1 and UE2 select the second pseudo-random permutation matrix, G(t+1), from a plurality of pseudo-random permutation matrices, because the second pseudo-random permutation matrix, G(t+1), corresponds to the second transmission time interval, t+1. The second pseudo-random permutation matrix, G(t+1), may be the following matrix, $$\begin{bmatrix} 0 & 1 \\ 1 & 0 \end{bmatrix},$$

where UE1 continues to correspond to the first (top) row of the matrix and UE2 continues to correspond to the second (bottom) row of the matrix. Regarding UE1, since the second column of the second pseudo-random permutation matrix, G(t+1), contains a 1, this indicates to UE1 to select the OCC codeword from the second row (e.g., the k-th row, where k equals 2) of the OCC matrix 502 as the OCC codeword for the transmission during the second transmission time interval, t+1. Regarding UE2, since the first column of the second pseudo-random permutation matrix, G(t+1), contains a 1, this indicates to UE2 to select the OCC codeword from the first row (e.g., the k-th row, where k equals 1) of the OCC matrix 502 as the OCC codeword for the transmission during the second transmission time interval, t+1. UE1 uses the selected OCC codeword for encoding and sending the transmission 508 during the second transmission time interval, t+1. UE2 uses the selected OCC codeword for encoding and sending the transmission 510 during the second transmission time interval, t+1. In the present aspect, the first pseudo-random permutation matrix, G(t) is different than the second pseudo-random permutation matrix, G(t+1). However, in some aspects, the first pseudo-random permutation matrix, G(t) may be the same as the second pseudo-random permutation matrix, G(t+1). That is, consecutive pseudo-random permutation matrices for consecutive transmission time intervals may be the same.

At time interval t+2, $s_1^2$ corresponds to a transmission of UE1 to be encoded using an OCC codeword and $s_2^2$ corresponds to a transmission of UE2 to be encoded using an OCC codeword. UE1 and UE2 select the third pseudo-random permutation matrix, G(t+2), from a plurality of pseudo-random permutation matrices, because the third pseudo-random permutation matrix, G(t+2), corresponds to the third transmission time interval, t+2. The third pseudo-random permutation matrix, G(t+2), may be the following matrix, $$\begin{bmatrix} 1 & 0 \\ 0 & 1 \end{bmatrix},$$

where UE1 continues to correspond to the first (top) row of the matrix and UE2 continues to correspond to the second (bottom) row of the matrix. Regarding UE1, since the first column of the third pseudo-random permutation matrix, G(t+2), contains a 1, this indicates to UE1 to select the OCC codeword from the first row (e.g., the k-th row, where k equals 1) of the OCC matrix 502 as the OCC codeword for the transmission during the third transmission time interval, t+2. Regarding UE2, since the second column of the pseudo-random permutation matrix, G(t+2), contains a 1, this indicates to UE2 to select the OCC codeword from the first row (e.g., the k-th row, where k equals 2) of the OCC matrix 502 as the OCC codeword for the transmission during the third transmission time interval, t+2. UE1 uses the selected OCC codeword for encoding and sending the transmission 512 during the third transmission time interval, t+2. UE2 uses the selected OCC codeword for encoding and sending the transmission 514 during the third transmission time interval, t+2.

The aforementioned interference randomization scheme of using a plurality of pseudo-random permutation matrices each corresponding to one of a plurality of transmission time intervals for selecting the OCC codeword enables randomization of assigned OCC codewords to apparatuses through the transmission timeframe. It should be understood that other methods of pseudo-randomizing may be implemented in the interference randomization scheme. That is, methods of pseudo-randomizing may utilize a pseudo-random codeword allocator function configured as an expression, a matrix, a logical operation, or the like to indicate to a UE which codeword from the OCC matrix is to be selected for a corresponding transmission time interval (e.g., e.g., t, t+1, t+2, . . . ) of the predefined transmission timeframe, T.

Additionally, the pseudo-random permutation matrices and/or the OCC matrix may have dimensions that are larger than M equal to two.

Example Operations of a User Equipment

Figure 6:
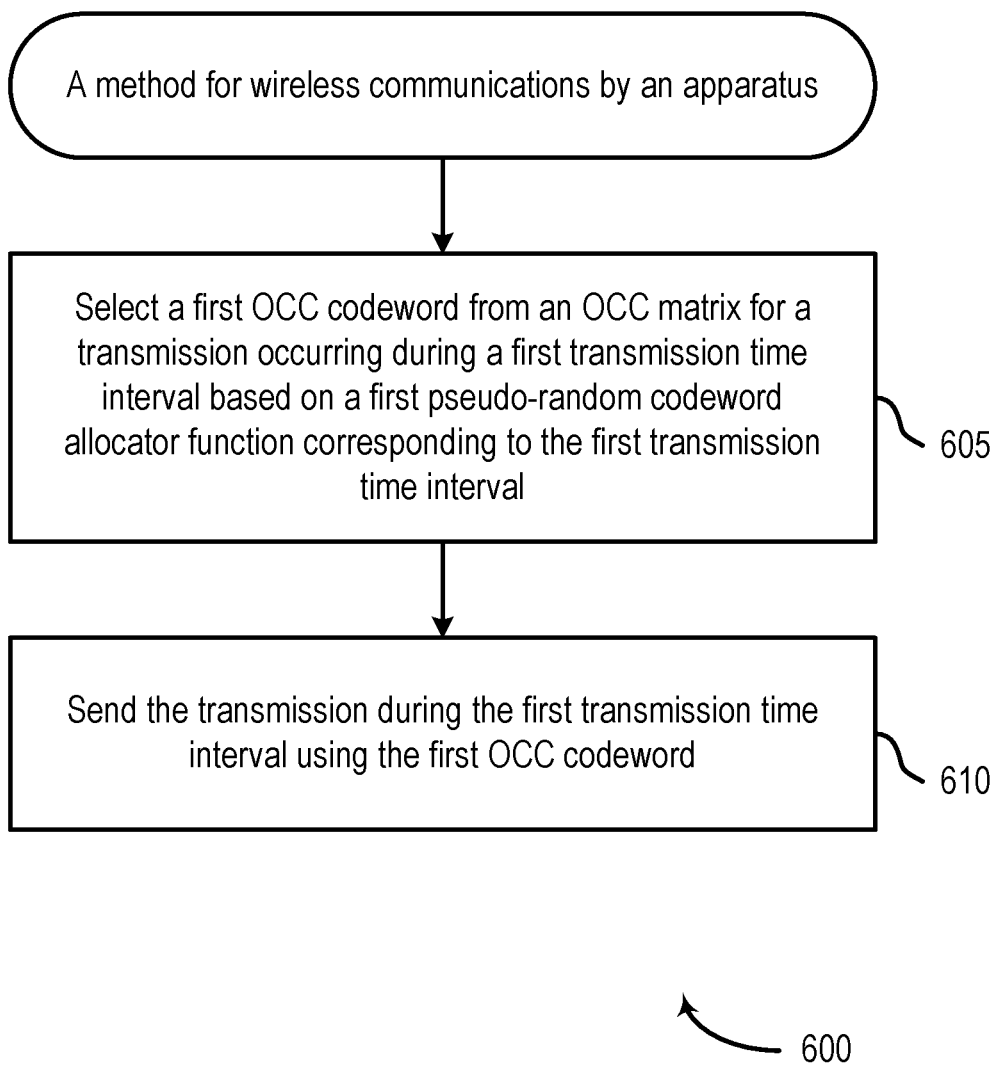
FIG. 6 depicts a method for wireless communications.

FIG. 6 shows a method 600 for wireless communications by an apparatus, such as UE 104 of FIGS. 1 and 3.

Method 600 begins at step 605 with selecting a first OCC codeword from an OCC matrix for a transmission occurring during a first transmission time interval based on a first pseudo-random codeword allocator function, such as a first pseudo-random permutation matrix, corresponding to the first transmission time interval. For example, as shown above in FIG. 5 with reference to the first transmission time interval, t.

Method 600 then proceeds to step 610 with sending the transmission during the first transmission time interval using the first OCC codeword.

In one aspect, method 600 further includes selecting, as the first pseudo-random codeword allocator function from a plurality of pseudo-random codeword allocator functions, a pseudo-random codeword allocator function that corresponds to the first transmission time interval, wherein the first transmission time interval is among a plurality of transmission time intervals within a predefined transmission timeframe. For example, the first pseudo-random codeword allocator function may be G(t) as shown and described with reference to FIG. 5 above.

In one aspect, the OCC matrix defines a plurality of OCC codewords. For example, as shown in FIG. 5, the OCC matrix 502 may be an orthogonal matrix such as a Hadamard matrix.

In one aspect, method 600 further includes generating the first pseudo-random codeword allocator function based on a seed value.

In one aspect, method 600 further includes generating, for each transmission time interval within a predefined transmission timeframe, a pseudo-random codeword allocator function using the seed value.

In one aspect, generation of the pseudo-random codeword allocator function is based on a combination of the seed value and a predefined codeword allocator function.

In one aspect, the seed value is based on at least one of a cell identification number, a user equipment identification number, a frame index, or a subframe index.

In one aspect, method 600 further includes being configured by a network with the seed value.

In one aspect, the first pseudo-random codeword allocator function comprises a pseudo-random permutation matrix having a dimension of M, where M corresponds to a number of user equipment capable of being supported by multiplexing with a network.

In one aspect, the first pseudo-random codeword allocator function comprises a pseudo-random permutation matrix having a dimension of M×M, where M corresponds to a number of user equipment capable of being supported by multiplexing with a network.

In one aspect, the OCC matrix is a Hadamard matrix or a discrete Fourier transformation matrix.

In one aspect, the OCC matrix comprises a dimension of M, where M corresponds to a number of user equipment capable of being supported by multiplexing with a network.

In one aspect, the OCC matrix comprises a dimension of M×M, where M corresponds to a number of user equipment capable of being supported by multiplexing with a network.

In one aspect, method 600 further includes obtaining information comprising a multiplexing order of the network, wherein M is the multiplexing order.

In one aspect, method 600 further includes selecting a second OCC codeword from the OCC matrix for a second transmission occurring during a subsequent transmission time interval based on a second pseudo-random codeword allocator function, wherein the second pseudo-random codeword allocator function corresponds to the subsequent transmission time interval.

In one aspect, method 600 further includes sending the second transmission during the subsequent transmission time interval using the second OCC codeword.

In one aspect, the first OCC codeword for the first transmission time interval and the second OCC codeword for the subsequent transmission time interval are different codewords.

In one aspect, the first OCC codeword for the first transmission time interval and the second OCC codeword for the subsequent transmission time interval comprise matching codewords.

In one aspect, the transmission comprises data and/or a reference signal on at least one of a PUSCH or a DMRS.

In one aspect, method 600 further includes selecting one OCC codeword for use during each transmission time interval of a predefined transmission timeframe, wherein the one OCC codeword is selected from the OCC matrix based on a pseudo-random codeword allocator function corresponding to each transmission time interval of the predefined transmission timeframe.

In one aspect, method 600 further includes sending each transmission using the selected OCC codeword for the transmission time interval during the predefined transmission timeframe.

In one aspect, method 600 further includes sending an indication that the UE supports multiplexing.

In one aspect, the indication further indicates a phase coherence capability of the UE.

In one aspect, method 600 further includes obtaining information indicating one or more signals that support application of OCC on a network.

In one aspect, method 600 further includes obtaining a plurality of pseudo-random codeword allocator functions, such as a plurality of permutation matrices, from a network entity.

Figure 8:
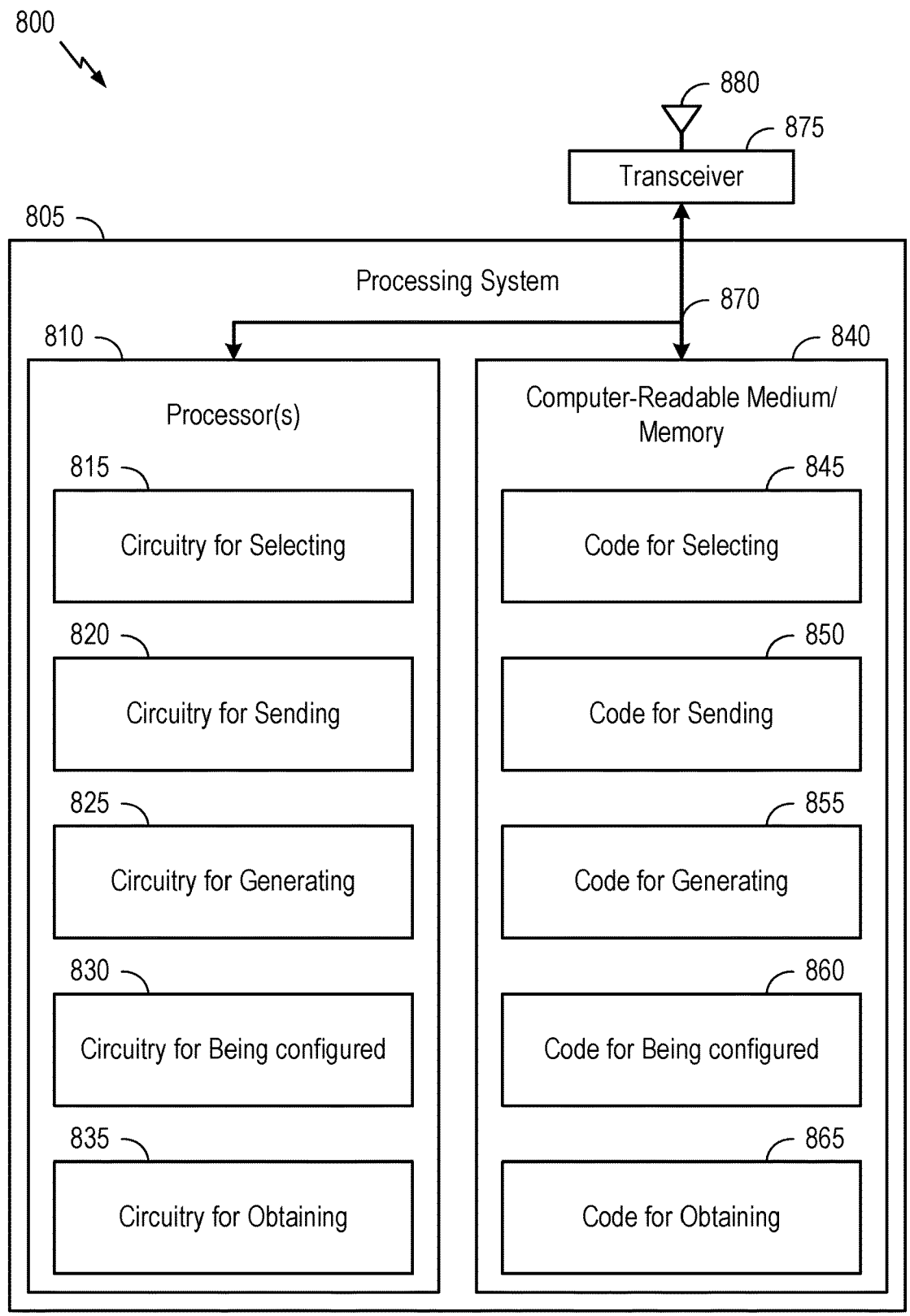
FIG. 8 depicts aspects of an example communications device.

In one aspect, method 600, or any aspect related to it, may be performed by an apparatus, such as communications device 800 of FIG. 8, which includes various components operable, configured, or adapted to perform the method 600. Communications device 800 is described below in further detail.

Note that FIG. 6 is just one example of a method, and other methods including fewer, additional, or alternative steps are possible consistent with this disclosure.

Example Operations of a Network Entity

Figure 7:
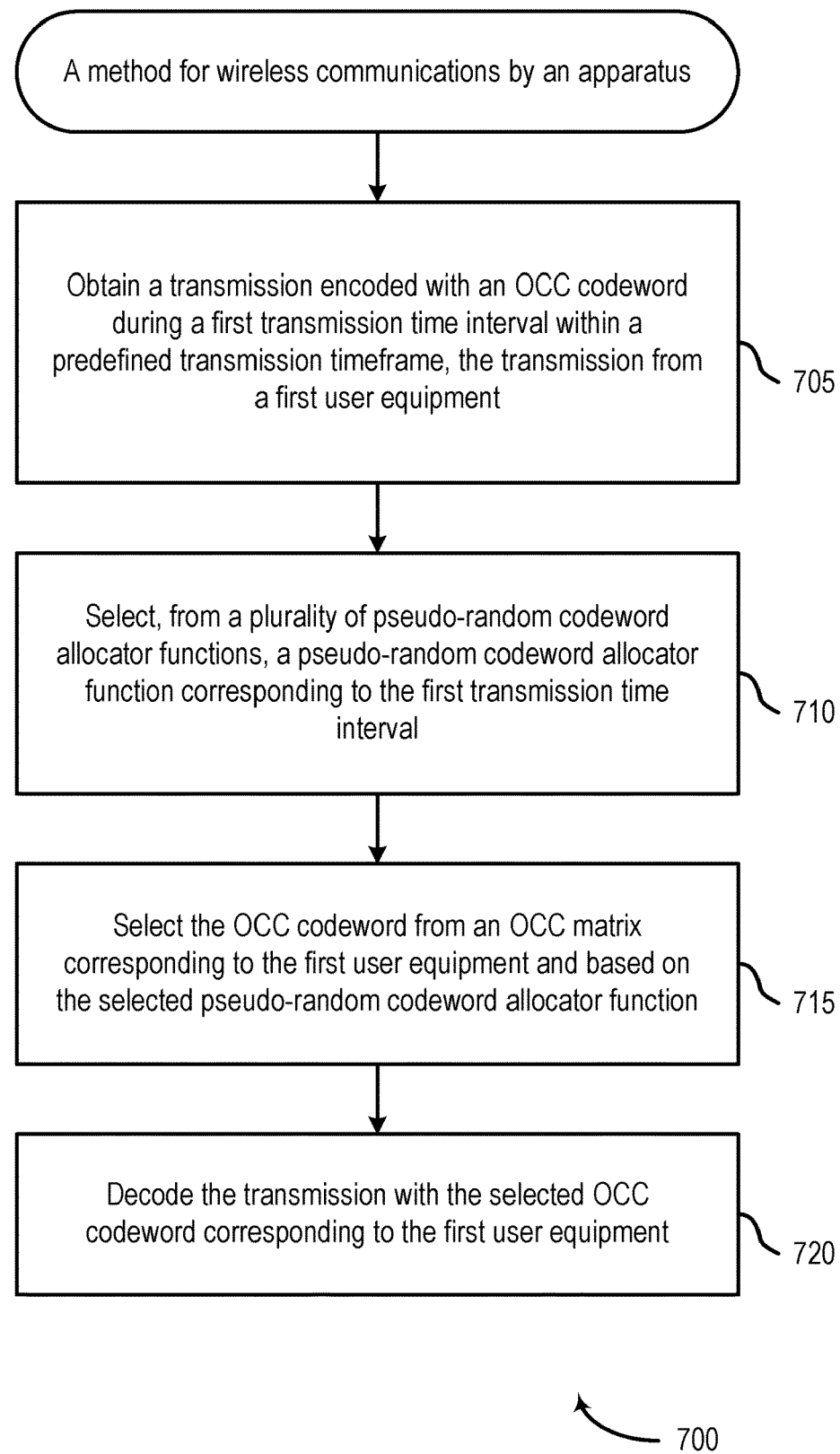
FIG. 7 depicts another method for wireless communications.

FIG. 7 shows a method 700 for wireless communications at a network entity, such as BS 102 of FIGS. 1 and 3, or a disaggregated base station as discussed with respect to FIG. 2.

Method 700 begins at step 705 with obtaining a transmission encoded with an OCC codeword during a first transmission time interval within a predefined transmission timeframe, the transmission from a first user equipment.

Method 700 then proceeds to step 710 with selecting, from a plurality of pseudo-random codeword allocator functions, such as a plurality of pseudo-random permutation matrices, a pseudo-random codeword allocator function, such as a pseudo-random permutation matrix, corresponding to the first transmission time interval.

Method 700 then proceeds to step 715 with selecting the OCC codeword from an OCC matrix corresponding to the first user equipment and based on the selected pseudo-random codeword allocator function.

Method 700 then proceeds to step 720 with decoding the transmission with the selected OCC codeword corresponding to the first user equipment.

In one aspect, method 700 further includes sending information comprising an interference randomization configuration for a network. The interference randomization configuration indicates that the OCC codeword is to be selected for transmission time intervals within the predefined transmission timeframe. For example, the interference randomization configuration indicates the ability for network and the UE to change the OCC codewords for different time intervals (e.g., based on the generated permutation matrices) during the predefined transmission timeframe.

In one aspect, the interference randomization configuration is configured for transmission using RRC signaling.

In one aspect, the interference randomization configuration is configured for transmission using MAC control element signaling.

In one aspect, method 700 further includes sending a multiplexing order of a network based on a phase coherence capability of a user equipment.

In one aspect, method 700 further includes sending information indicating one or more signals that support application of OCC on a network.

In one aspect, method 700 further includes sending a seed value for use on a network.

In one aspect, method 700 further includes generating the plurality of pseudo-random codeword allocator functions based on a combination of a seed value and a predefined codeword allocator function.

Figure 9:
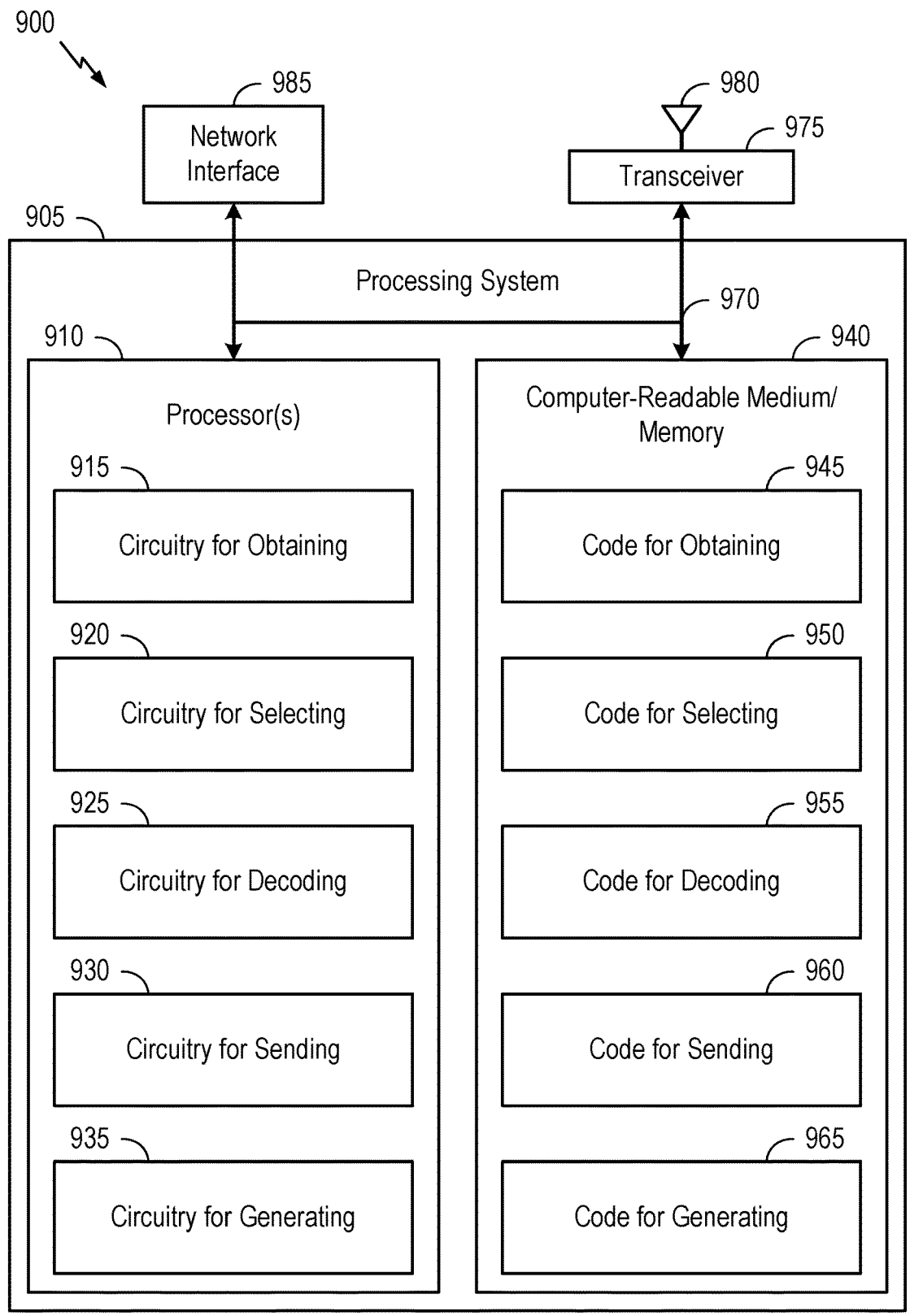
FIG. 9 depicts aspects of an example communications device.

In one aspect, method 700, or any aspect related to it, may be performed by an apparatus, such as communications device 900 of FIG. 9, which includes various components operable, configured, or adapted to perform the method 700. Communications device 900 is described below in further detail.

Note that FIG. 7 is just one example of a method, and other methods including fewer, additional, or alternative steps are possible consistent with this disclosure.

Example Communications Devices

FIG. 8 depicts aspects of an example communications device 800. In some aspects, communications device 800 is a user equipment, such as UE 104 described above with respect to FIGS. 1 and 3.

The communications device 800 includes a processing system 805 coupled to a transceiver 875 (e.g., a transmitter and/or a receiver). The transceiver 875 is configured to transmit and receive signals for the communications device 800 via an antenna 880, such as the various signals as described herein. The processing system 805 may be configured to perform processing functions for the communications device 800, including processing signals received and/or to be transmitted by the communications device 800.

The processing system 805 includes one or more processors 810. In various aspects, the one or more processors 810 may be representative of one or more of receive processor 358, transmit processor 364, TX MIMO processor 366, and/or controller/processor 380, as described with respect to FIG. 3. The one or more processors 810 are coupled to a computer-readable medium/memory 840 via a bus 870. In certain aspects, the computer-readable medium/memory 840 is configured to store instructions (e.g., computer-executable code) that when executed by the one or more processors 810, enable and cause the one or more processors 810 to perform the method 600 described with respect to FIG. 6, or any aspect related to it, including any additional steps or sub-steps described in relation to FIG. 6. Note that reference to a processor performing a function of communications device 800 may include one or more processors performing that function of communications device 800, such as in a distributed fashion.

In the depicted example, computer-readable medium/memory 840 stores code for selecting 845, code for sending 850, code for generating 855, code for being configured 860, and code for obtaining 865. Processing of the code 845-865 may enable and cause the communications device 800 to perform the method 600 described with respect to FIG. 6, or any aspect related to it.

The one or more processors 810 include circuitry configured to implement (e.g., execute) the code stored in the computer-readable medium/memory 840, including circuitry for selecting 815, circuitry for sending 820, circuitry for generating 825, circuitry for being configured 830, and circuitry for obtaining 835. Processing with circuitry 815-835 may enable and cause the communications device 800 to perform the method 600 described with respect to FIG. 6, or any aspect related to it.

More generally, means for communicating, transmitting, sending or outputting for transmission may include the transceivers 354, antenna(s) 352, transmit processor 364, TX MIMO processor 366, and/or controller/processor 380 of the UE 104 illustrated in FIG. 3, transceiver 875 and/or antenna 880 of the communications device 800 in FIG. 8, and/or one or more processors 810 of the communications device 800 in FIG. 8. Means for communicating, receiving or obtaining may include the transceivers 354, antenna(s) 352, receive processor 358, and/or controller/processor 380 of the UE 104 illustrated in FIG. 3, transceiver 875 and/or antenna 880 of the communications device 800 in FIG. 8, and/or one or more processors 810 of the communications device 800 in FIG. 8.

FIG. 9 depicts aspects of an example communications device 900. In some aspects, communications device 900 is a network entity, such as BS 102 of FIGS. 1 and 3, or a disaggregated base station as discussed with respect to FIG. 2.

The communications device 900 includes a processing system 905 coupled to a transceiver 975 (e.g., a transmitter and/or a receiver) and/or a network interface 985. The transceiver 975 is configured to transmit and receive signals for the communications device 900 via an antenna 980, such as the various signals as described herein. The network interface 985 is configured to obtain and send signals for the communications device 900 via communications link(s), such as a backhaul link, midhaul link, and/or fronthaul link as described herein, such as with respect to FIG. 2. The processing system 905 may be configured to perform processing functions for the communications device 900, including processing signals received and/or to be transmitted by the communications device 900.

The processing system 905 includes one or more processors 910. In various aspects, one or more processors 910 may be representative of one or more of receive processor 338, transmit processor 320, TX MIMO processor 330, and/or controller/processor 340, as described with respect to FIG. 3. The one or more processors 910 are coupled to a computer-readable medium/memory 940 via a bus 970. In certain aspects, the computer-readable medium/memory 940 is configured to store instructions (e.g., computer-executable code) that when executed by the one or more processors 910, enable and cause the one or more processors 910 to perform the method 700 described with respect to FIG. 7, or any aspect related to it, including any additional steps or sub-steps described in relation to FIG. 7. Note that reference to a processor of communications device 900 performing a function may include one or more processors of communications device 900 performing that function, such as in a distributed fashion.

In the depicted example, the computer-readable medium/memory 940 stores code for obtaining 945, code for selecting 950, code for decoding 955, code for sending 960, and code for generating 965. Processing of the code 945-965 may enable and cause the communications device 900 to perform the method 700 described with respect to FIG. 7, or any aspect related to it.

The one or more processors 910 include circuitry configured to implement (e.g., execute) the code stored in the computer-readable medium/memory 940, including circuitry for obtaining 915, circuitry for selecting 920, circuitry for decoding 925, circuitry for sending 930, and circuitry for generating 935. Processing with circuitry 915-935 may enable and cause the communications device 900 to perform the method 700 described with respect to FIG. 7, or any aspect related to it.

More generally, means for communicating, transmitting, sending or outputting for transmission may include the transceivers 332, antenna(s) 334, transmit processor 320, TX MIMO processor 330, and/or controller/processor 340 of the BS 102 illustrated in FIG. 3, transceiver 975 and/or antenna 980 of the communications device 900 in FIG. 9, and/or one or more processors 910 of the communications device 900 in FIG. 9. Means for communicating, receiving or obtaining may include the transceivers 332, antenna(s) 334, receive processor 338, and/or controller/processor 340 of the BS 102 illustrated in FIG. 3, transceiver 975 and/or antenna 980 of the communications device 900 in FIG. 9, and/or one or more processors 910 of the communications device 900 in FIG. 9.

Example Clauses

Implementation examples are described in the following numbered clauses:

Clause 1: A method for wireless communications by an apparatus, comprising: selecting a first OCC codeword from an OCC matrix for a transmission occurring during a first transmission time interval based on a first pseudo-random codeword allocator function corresponding to the first transmission time interval; and sending the transmission during the first transmission time interval using the first OCC codeword.

Clause 2: The method of Clause 1, further comprising selecting, as the first pseudo-random codeword allocator function from a plurality of pseudo-random codeword allocator functions, a pseudo-random codeword allocator function that corresponds to the first transmission time interval, wherein the first transmission time interval is among a plurality of transmission time intervals within a predefined transmission timeframe.

Clause 3: The method of any one of Clauses 1-2, further comprising generating the first pseudo-random codeword allocator function based on a seed value.

Clause 4: The method of Clause 3, further comprising generating, for each transmission time interval within a predefined transmission timeframe, a pseudo-random codeword allocator function using the seed value.

Clause 5: The method of Clause 4, wherein generation of the pseudo-random codeword allocator function is based on a combination of the seed value and a predefined codeword allocator function.

Clause 6: The method of Clause 3, wherein the seed value is based on at least one of a cell identification number, a user equipment identification number, a frame index, or a subframe index.

Clause 7: The method of Clause 3, further comprising being configured by a network with the seed value.

Clause 8: The method of any one of Clauses 1-8, wherein the first pseudo-random codeword allocator function comprises a pseudo-random permutation matrix having a dimension of M×M, where M corresponds to a number of user equipment capable of being supported by multiplexing with a network.

Clause 9: The method of any one of Clauses 1-8, wherein the OCC matrix defines a plurality of OCC codewords and the plurality of OCC codewords is based on M, wherein M is a multiplexing order.

Clause 10: The method of any one of Clauses 1-9, wherein the OCC matrix is an orthogonal matrix.

Clause 11: The method of Clause 10, wherein the OCC matrix is a Hadamard matrix or a discrete Fourier transformation matrix.

Clause 12: The method of any one of Clauses 1-11, wherein the OCC matrix comprises a dimension of M×M, where M corresponds to a number of user equipment capable of being supported by multiplexing with a network.

Clause 13: The method of Clause 12, further comprising obtaining information comprising a multiplexing order of the network, wherein M is the multiplexing order.

Clause 14: The method of any one of Clauses 1-13, further comprising: selecting a second OCC codeword from the OCC matrix for a second transmission occurring during a subsequent transmission time interval based on a second pseudo-random codeword allocator function, wherein the second pseudo-random codeword allocator function corresponds to the subsequent transmission time interval; and sending the second transmission during the subsequent transmission time interval using the second OCC codeword.

Clause 15: The method of Clause 14, wherein the first OCC codeword for the first transmission time interval and the second OCC codeword for the subsequent transmission time interval are different codewords.

Clause 16: The method of Clause 14, wherein the first OCC codeword for the first transmission time interval and the second OCC codeword for the subsequent transmission time interval comprise matching codewords.

Clause 17: The method of any one of Clauses 1-16, wherein the transmission comprises a data signal, a reference signal, or a random access signal.

Clause 18: The method of any one of Clauses 1-17, further comprising: selecting one OCC codeword for use during each transmission time interval of a predefined transmission timeframe, wherein the one OCC codeword is selected from the OCC matrix based on a pseudo-random codeword allocator function corresponding to each transmission time interval of the predefined transmission timeframe; and sending each transmission using the selected OCC codeword for the transmission time interval during the predefined transmission timeframe.

Clause 19: The method of any one of Clauses 1-18, further comprising sending an indication that the apparatus supports multiplexing.

Clause 20: The method of Clause 19, wherein the indication further indicates a phase coherence capability of the apparatus.

Clause 21: The method of any one of Clauses 1-20, further comprising obtaining information indicating one or more signals that support application of OCC on a network.

Clause 22: The method of any one of Clauses 1-21, further comprising obtaining a plurality of pseudo-random codeword allocator functions from a network entity.

Clause 23: A method for wireless communications by an apparatus, comprising: obtaining a transmission encoded with an OCC codeword during a first transmission time interval within a predefined transmission timeframe, the transmission from a first user equipment; selecting, from a plurality of pseudo-random codeword allocator functions, a pseudo-random codeword allocator function corresponding to the first transmission time interval; selecting the OCC codeword from an OCC matrix corresponding to the first user equipment and based on the selected pseudo-random codeword allocator function; and decoding the transmission with the selected OCC codeword corresponding to the first user equipment.

Clause 24: The method of Clause 23, further comprising sending information comprising an interference randomization configuration for a network, wherein the interference randomization configuration indicates that the OCC codeword is to be selected for transmission time intervals within the predefined transmission timeframe.

Clause 25: The method of Clause 24, wherein the interference randomization configuration is configured for transmission using RRC signaling or MAC control element signaling.

Clause 26: The method of Clause 23, wherein the interference randomization configuration is configured for transmission using MAC control element signaling.

Clause 27: The method of any one of Clauses 23-26, further comprising sending a multiplexing order of a network based on a phase coherence capability of a user equipment.

Clause 28: The method of any one of Clauses 23-27, further comprising sending information indicating one or more signals that support application of OCC on a network.

Clause 29: The method of any one of Clauses 23-28, further comprising sending a seed value for use on a network.

Clause 30: The method of any one of Clauses 23-29, further comprising generating the plurality of pseudo-random codeword allocator functions based on a combination of a seed value and a predefined codeword allocator function.

Clause 31: One or more apparatuses, comprising: one or more memories comprising executable instructions; and one or more processors configured to execute the executable instructions and cause the one or more apparatuses to perform a method in accordance with any one of clauses 1-30.

Clause 32: One or more apparatuses, comprising means for performing a method in accordance with any one of clauses 1-30.

Clause 33: One or more non-transitory computer-readable media comprising executable instructions that, when executed by one or more processors of one or more apparatuses, cause the one or more apparatuses to perform a method in accordance with any one of clauses 1-30.

Clause 34: One or more computer program products embodied on one or more computer-readable storage media comprising code for performing a method in accordance with any one of clauses 1-30.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, "coupled to" and "coupled with" generally encompass direct coupling and indirect coupling (e.g., including intermediary coupled aspects) unless stated otherwise. For example, stating that a processor is coupled to a memory allows for a direct coupling or a coupling via an intermediary aspect, such as a bus.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Reference to an element in the singular is not intended to mean only one unless specifically so stated, but rather "one or more." For example, reference to an element (e.g., "a processor," "a controller," "a memory," etc.), unless otherwise specifically stated, should be understood to refer to one or more elements (e.g., "one or more processors," "one or more controllers," "one or more memories," etc.). The terms "set" and "group" are intended to include one or more elements, and may be used interchangeably with "one or more." Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions. Unless specifically stated otherwise, the term "some" refers to one or more. All structural and functional equivalents to the elements of the various aspects described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims.

What is claimed is:

1. An apparatus configured for wireless communications, comprising: one or more memories comprising processor-executable instructions; and one or more processors configured to execute the processor-executable instructions and cause the apparatus to:
select a first orthogonal cover code (OCC) codeword from an OCC matrix for a transmission occurring during a first transmission time interval based on a first pseudo-random codeword allocator function corresponding to the first transmission time interval;
encode the transmission, comprising signals corresponding to data, using the first OCC codeword;
send the transmission during the first transmission time interval using the first OCC codeword;
select a second OCC codeword from the OCC matrix for a second transmission occurring during a subsequent transmission time interval based on a second pseudo-random codeword allocator function, wherein the second pseudo-random codeword allocator function corresponds to the subsequent transmission time interval and the first pseudo-random codeword allocator function and the second pseudo-random codeword allocator function are different pseudo-random codeword allocator functions; and
send the second transmission during the subsequent transmission time interval using the second OCC codeword.

2. The apparatus of claim 1, wherein the one or more processors are configured to execute the processor-executable instructions and further cause the apparatus to select, as the first pseudo-random codeword allocator function from a plurality of pseudo-random codeword allocator functions, a pseudo-random codeword allocator function that corresponds to the first transmission time interval, wherein the first transmission time interval is among a plurality of transmission time intervals within a predefined transmission timeframe.

3. The apparatus of claim 1, wherein the one or more processors are configured to execute the processor-executable instructions and further cause the apparatus to generate the first pseudo-random codeword allocator function based on a seed value.

4. The apparatus of claim 3, wherein the one or more processors are configured to execute the processor-executable instructions and further cause the apparatus to generate, for each transmission time interval within a predefined transmission timeframe, a pseudo-random codeword allocator function using the seed value.

5. The apparatus of claim 4, wherein generation of the pseudo-random codeword allocator function is based on a combination of the seed value and a predefined codeword allocator function.

6. The apparatus of claim 3, wherein the seed value is based on at least one of a cell identification number, a user equipment identification number, a frame index, or a subframe index.

7. The apparatus of claim 3, wherein the one or more processors are configured to execute the processor-executable instructions and further cause the apparatus to be configured by a network with the seed value.

8. The apparatus of claim 1, wherein the first pseudo-random codeword allocator function comprises a pseudo-random permutation matrix having a dimension based on M, where M corresponds to a number of user equipment capable of being supported by multiplexing with a network.

9. The apparatus of claim 1, wherein the OCC matrix defines a plurality of OCC codewords and the plurality of OCC codewords is based on M, wherein M is a multiplexing order.

10. The apparatus of claim 1, wherein the OCC matrix is an orthogonal matrix.

11. The apparatus of claim 10, wherein the OCC matrix is a Hadamard matrix or a discrete Fourier transformation matrix.

12. The apparatus of claim 1, wherein the OCC matrix comprises a dimension based on M, where M corresponds to a number of user equipment capable of being supported by multiplexing with a network.

13. The apparatus of claim 12, wherein the one or more processors are configured to execute the processor-executable instructions and further cause the apparatus to obtain information comprising a multiplexing order of the network, wherein M is the multiplexing order.

14. The apparatus of claim 1, wherein the first OCC codeword for the first transmission time interval and the second OCC codeword for the subsequent transmission time interval are different codewords.

15. The apparatus of claim 1, wherein the first OCC codeword for the first transmission time interval and the second OCC codeword for the subsequent transmission time interval comprise matching codewords.

16. The apparatus of claim 1, wherein the transmission comprises a data signal, a reference signal, or a random access signal.

17. The apparatus of claim 1, wherein the one or more processors are configured to execute the processor-executable instructions and further cause the apparatus to:
select one OCC codeword for use during each transmission time interval of a predefined transmission timeframe, wherein the one OCC codeword is selected from the OCC matrix based on a pseudo-random codeword allocator function corresponding to each transmission time interval of the predefined transmission timeframe; and
send each transmission using the selected OCC codeword selected for the transmission time interval during the predefined transmission timeframe.

18. The apparatus of claim 1, wherein the one or more processors are configured to execute the processor-executable instructions and further cause the apparatus to send an indication that the apparatus supports multiplexing.

19. The apparatus of claim 18, wherein the indication further indicates a phase coherence capability of the apparatus.

20. The apparatus of claim 1, wherein the one or more processors are configured to execute the processor-executable instructions and further cause the apparatus to obtain information indicating one or more signals that support application of OCC on a network.

21. The apparatus of claim 1, wherein the one or more processors are configured to execute the processor-executable instructions and further cause the apparatus to obtain a plurality of pseudo-random codeword allocator functions from a network entity.

22. An apparatus configured for wireless communications, comprising: one or more memories comprising processor-executable instructions; and one or more processors configured to execute the processor-executable instructions and cause the apparatus to:
- obtain a first transmission comprising signals corresponding to data encoded with a first OCC codeword during a first transmission time interval within a first predefined transmission timeframe, the first transmission from a first user equipment;
- select, from a plurality of pseudo-random codeword allocator functions, a first pseudo-random codeword allocator function corresponding to the first transmission time interval;
- select the first OCC codeword from an OCC matrix corresponding to the first user equipment and based on the first pseudo-random codeword allocator function;
- decode the first transmission with the first OCC codeword corresponding to the first user equipment;
- obtain a second transmission comprising signals corresponding to data encoded with a second OCC codeword during a second transmission time interval within a second predefined transmission timeframe, the second transmission from the first user equipment;
- select, from the plurality of pseudo-random codeword allocator functions, a second pseudo-random codeword allocator function corresponding to the second transmission time interval, wherein the first pseudo-random codeword allocator function and the second pseudo-random codeword allocator function are different pseudo-random codeword allocator functions;
- select the second OCC codeword from the OCC matrix corresponding to the first user equipment and based on the second pseudo-random codeword allocator function; and
- decode the second transmission with the second OCC codeword.

23. The apparatus of claim 22, wherein the one or more processors are configured to execute the processor-executable instructions and further cause the apparatus to send information comprising an interference randomization configuration for a network, wherein the interference randomization configuration indicates that the first OCC codeword is to be selected for the first transmission time interval within the first predefined transmission timeframe.

24. The apparatus of claim 23, wherein the interference randomization configuration is configured for transmission using radio resource control (RRC) signaling or medium access control (MAC) control element signaling.

25. The apparatus of claim 22, wherein the one or more processors are configured to execute the processor-executable instructions and further cause the apparatus to send a multiplexing order of a network based on a phase coherence capability of a user equipment.

26. The apparatus of claim 22, wherein the one or more processors are configured to execute the processor-executable instructions and further cause the apparatus to send information indicating one or more signals that support application of OCC on a network.

27. The apparatus of claim 22, wherein the one or more processors are configured to execute the processor-executable instructions and further cause the apparatus to generate the plurality of pseudo-random codeword allocator functions based on a combination of a seed value and a predefined codeword allocator function.

28. A method for wireless communications by an apparatus, comprising:
- selecting a first orthogonal cover code (OCC) codeword from an OCC matrix for a transmission occurring during a first transmission time interval based on a first pseudo-random codeword allocator function corresponding to the first transmission time interval;
- encoding the transmission, comprising signals corresponding to data, using the first OCC codeword;
- sending the transmission during the first transmission time interval using the first OCC codeword;
- selecting a second OCC codeword from the OCC matrix for a second transmission occurring during a subsequent transmission time interval based on a second pseudo-random codeword allocator function, wherein the second pseudo-random codeword allocator function corresponds to the subsequent transmission time interval and the first pseudo-random codeword allocator function and the second pseudo-random codeword allocator function are different pseudo-random codeword allocator functions; and
- sending the second transmission during the subsequent transmission time interval using the second OCC codeword.

29. A method for wireless communications by an apparatus, comprising:
- obtaining a first transmission comprising signals corresponding to data encoded with a first OCC codeword during a first transmission time interval within a first predefined transmission timeframe, the first transmission from a first user equipment;
- selecting, from a plurality of pseudo-random codeword allocator functions, a first pseudo-random codeword allocator function corresponding to the first transmission time interval;
- selecting the first OCC codeword from an OCC matrix corresponding to the first user equipment and based on the first pseudo-random codeword allocator function;
- decoding the first transmission with the first OCC codeword corresponding to the first user equipment;
- obtaining a second transmission comprising signals corresponding to data encoded with a second OCC codeword during a second transmission time interval within a second predefined transmission timeframe, the second transmission from the first user equipment;
- selecting, from the plurality of pseudo-random codeword allocator functions, a second pseudo-random codeword allocator function corresponding to the second transmission time interval, wherein the first pseudo-random codeword allocator function and the second pseudo-random codeword allocator function are different pseudo-random codeword allocator functions;
- selecting the second OCC codeword from the OCC matrix corresponding to the first user equipment and based on the second pseudo-random codeword allocator function; and
- decoding the second transmission with the second OCC codeword.

* * * * *